(12) United States Patent
Filla

(10) Patent No.: US 8,447,483 B2
(45) Date of Patent: May 21, 2013

(54) METHOD FOR OPERATING A WORKING MACHINE AND A WORKING MACHINE WITH AN IMPROVED TRANSMISSION LINE

(75) Inventor: Reno Filla, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 669 days.

(21) Appl. No.: 12/444,424

(22) PCT Filed: Oct. 6, 2006

(86) PCT No.: PCT/SE2006/001141
§ 371 (c)(1),
(2), (4) Date: Dec. 11, 2009

(87) PCT Pub. No.: WO2008/041891
PCT Pub. Date: Apr. 10, 2008

(65) Prior Publication Data
US 2010/0094492 A1    Apr. 15, 2010

(51) Int. Cl.
*E02F 9/22* (2006.01)
*F15B 21/14* (2006.01)

(52) U.S. Cl.
USPC .............. 701/68; 701/50; 180/65.6; 180/65.8

(58) Field of Classification Search
None
See application file for complete search history.

(56) References Cited

U.S. PATENT DOCUMENTS

| 6,199,650 | B1 | 3/2001 | Masberg et al. |
| 2002/0148144 | A1* | 10/2002 | Tokunaga ........................ 37/348 |
| 2004/0192495 | A1* | 9/2004 | Hofler ............................. 477/57 |
| 2007/0099757 | A1* | 5/2007 | Landes .......................... 477/175 |

FOREIGN PATENT DOCUMENTS

| DE | 10158536 A1 | 7/2003 |
| DE | 10246839 A1 | 4/2004 |
| EP | 1505717 A1 | 2/2005 |
| EP | 1571352 A1 | 9/2005 |
| WO | WO 2007/043924 A1 * | 4/2007 |

OTHER PUBLICATIONS

International Search Report for corresponding International Application PCT/SE2006/001141, dated May 25, 2007.
Supplementary European Search Report (Dec. 17, 2012) for corresponding European Application EP 06 79 9741.

* cited by examiner

Primary Examiner — Michael J. Zanelli
(74) Attorney, Agent, or Firm — WRB-IP LLP

(57) ABSTRACT

A working machine and a method for operating the same are provided. The working machine is provided with: a power source and a plurality of driving wheels; a working hydraulic system including at least one hydraulic pump powered by the power source for moving an implement on the working machine and/or for steering the working machine; a transmission line arranged between the power source and the driving wheels for transmitting torque from the power source to the driving wheels; and a transmission unit arranged in the transmission line for reducing the mechanical interaction between the power source and the driving wheels. The method includes: detecting at least one operational parameter indicative of a working condition of the working machine; determining if the characteristic of the transmission unit should be altered on the basis of a magnitude of the detected operational parameter; altering the characteristic of the transmission unit if it is determined to be required.

37 Claims, 3 Drawing Sheets

METHOD FOR OPERATING A WORKING MACHINE AND A WORKING MACHINE WITH AN IMPROVED TRANSMISSION LINE

BACKGROUND AND SUMMARY

The invention relates to a method for operating a working machine and a working machine.

The invention is applicable on working machines within the field of industrial construction machines, in particular wheel loaders. Thus, the invention will be described with respect to a wheel loader. However, the invention is by no means limited to a particular working machine. On the contrary, the invention may be used in a plurality of heavy working machines, e.g. articulated haulers, trucks, bulldozers and excavators.

Wheel loaders are generally provided with an internal combustion engine, a transmission line, a gearbox, driving wheels and a working hydraulic system.

The combustion engine provides power to the different functions of the wheel loader. In particular, the combustion engine provides power to the transmission line and to the working hydraulic system of the wheel loader.

The transmission line transfers torque from the combustion engine to the gearbox, which in turn provides torque to the driving wheels of the loader. In particular, the gearbox provides different gear ratios for varying the speed of the driving wheels and for changing between forward and backward driving direction of the wheels.

The working hydraulic system is used for lifting operations and/or for steering the wheel loader. For this purpose there are at least one hydraulic working cylinder arranged in the wheel loader for lifting and lowering a lifting arm unit, on which a bucket or other type of attachment or working tool is mounted for example forks. By use of another hydraulic working cylinder, the bucket can also be tilted or pivoted. Further hydraulic cylinders known as steering cylinders are arranged to turn the wheel loader by means of relative movement of a front and rear body part of the wheel loader.

To protect the combustion engine of a wheel loader from rapid changes in the working conditions of the gearbox and the driving wheels it is common to provide the transmission line with a hydrodynamic torque converter or similar arranged between the combustion engine and the gearbox. The hydrodynamic torque converter provides an elasticity that enables a very quick adaptation of the output torque to the changes in the working conditions of the gearbox and the driving wheels of the loader. In addition, the torque converter provides an increased torque during particularly heavy working operations, e.g. during acceleration of the loader. However, these advantages are paid by high losses, since the elasticity and the increased torque provided by the torque converter are obtained by slipping between the impeller, turbine-wheel and the stator of the torque converter.

To utilize the advantages of a torque converter with respect to elasticity and torque increase for handling rapid changes in the working conditions, at the same time as the advantages of a purely mechanical transmission is utilized with respect to efficiency (in principle 100%), it has been increasingly common in working machines of today to introduce torque converters with a lock-up function. A lock-up function can provide a mechanical locking of the torque converter at a certain low degree of slipping, i.e. the gear ratio of the torque converter becomes fixed (1:1) at a certain low degree of slipping, e.g. at a low degree of slipping obtained during transportation speed. This may certainly be an alternative for wheel loaders in some specific applications.

However, the most typical application for wheel loaders is the so-called short-cycle load, in which the wheel loader moves materials between two places near to each other, e.g. moves gravel from a heap to the loading platform of a nearby truck. The transportation distances in such cycles are too short to let the torque converter reach the lock-up state. Moreover, a lock-up may not always be preferred since there is a strong interaction between the hydraulic system and the transmission line, which implies that the combustion engine benefits from the elasticity of the torque converter to reduce the interaction of the transmission line with the vehicle wheels. This is emphasized in modern wheel loaders wherein the combustion engine is utilized at lower rotational speeds due to fuel economy reasons, giving the engine even greater difficulties to recover from sudden increases in working load.

One may summarize by saying that designers would actually prefer a torque converter with a lock-up function adapted for transportation purposes. However, a lock-up function cannot be utilized in typical short-cycle loads or similar. Therefore a comparably rigid torque converter is chosen as the second best alternative. With a comparably rigid torque converter it is possible to obtain a good fuel economy both by utilizing a lower rotational speed for the combustion engine and by reducing any power consuming slipping in the torque converter. In the same way as in a rigid spring a rigid torque converter reacts less on an outer load than a soft converter. Hence, a rigid torque converter gives a reduced degree of slipping compared to a soft torque converter and the other way around; a rigid converter provides certain torque increase at a lower degree of slipping compared to a soft converter.

However, in some phases of a typical short-cycle load a much softer torque converter is preferred or even needed instead of the comparably rigid torque converter that is normally used. One such critical phase is produced when the bucket of a wheel loader is emptied on a nearby truck. Here, the bucket is usually nearly completely raised as the wheel loader approaches the truck. At the same time the hydraulic lift and tilt functions are exercised to raise the bucket even further and to finally emptying the bucket on the truck platform. In this situation it is desirable to roll slowly forward towards the truck in a controlled manner. However, a rigid torque converter will typically provide traction power for the driving wheels of such magnitude that the wheel loader rolls faster than desired even if the combustion engine is running on idle. This forces the operator of the loader to exercise the lifting, tilting and throttle controls to balance the lifting and tilting operations with the engine power (lifting and tilting may require more throttle to create the necessary power), at the same time as he has to exercise the brake to control the rolling speed. This is a rather complicated operation which lowers the productivity even for more experienced operators. In addition, this has the potential to increase the fuel consumption since the operator may choose to run the combustion engine at a higher rotation speed to meet the load from the hydraulic system while the forward rolling of the loader is controlled by the brake pedal.

Another critical phase is produced when the bucket of a wheel loader is to be filled. Naturally, it is preferred that the bucket is filled in a quick and efficient manner. This is accomplished by the operator trying to find the right balance between the bucket movement (controlled by the lifting and tilting functions) and the penetration the forward rolling controlled by the throttle pedal). Here, the traction forces from the wheels of the loader are in many situations counteracting the forces from the moving bucket i.e. the tilt and lift movements). To accomplish a quick and efficient filling of the bucket and simultaneously handling the forces from the wheels and the bucket is a more or less complicated task depending on the characteristics of the wheel loader. Here, the rigidness of the torque converter is an essential component.

Hence, both in the bucket emptying phase and in the bucket filling phase it is preferred to utilize a soft torque converter. In the bucket emptying phase this enables an improved coordination of the bucket and wheel loader movements. In the bucket filling phase this enables an improved balancing of the forces created by the bucket and wheel loader movements.

However, a soft torque converter is only preferred in such critical phases of a short-cycle load as those described above and similar. In the other phases of a short-cycle load a rigid torque converter is preferred for the reasons of performance and fuel economy.

Considering the above there is clearly a need for a working machine with a transmission line comprising a transmission unit {e.g. a torque converter) where the working machine is provided with an ability to overcome the shortcomings of known transmission units being less suitable for at least some working conditions of the working machine.

It is desirable to provide a method of the kind referred to in the introduction, which creates conditions for a more effective operation of the working machine.

According to an aspect of the present invention, a method is provided for operating a working machine provided with: a power source and a plurality of driving wheels; a working hydraulic system comprising at least one hydraulic pump powered by the power source for moving an implement on the working machine and/or for steering the working machine; a transmission line arranged between the power source and the driving wheels for transmitting torque from the power source to the driving wheels; and a transmission unit arranged in the transmission line for reducing the mechanical interaction between the power source and the driving wheels.

The method is characterized by the steps of:
detecting at least one operational parameter indicative of a working condition of the working machine,
determining if the characteristic of the transmission unit should be altered on the basis of a magnitude of the detected operational parameter,
altering the characteristic of the transmission unit if it is determined to be required.

Altering the characteristic of the transmission unit by means of the above method provides a working machine with an improved ability to overcome the shortcomings of known transmission units being less suitable for at least some working conditions of the working machine.

This is particularly so if the working condition determines a predetermined working operation with the implement, since this constitutes a typical situation in which the need for altering the characteristic of the transmission unit can arise. Here, it may e.g. be advantageous to altering the characteristic of the transmission unit so as to reduce the mechanical interaction between the power source and the driving wheels even more leaving the driving wheels with less power and the hydraulic system with an increased power.

It is preferred that the characteristic is altered by means of at least one electric machine, since this enables a flexible and compact design. An electric machine can also be powered by means of a plurality of power sources (e.g. batteries, generators, fuel cells etc), which provides an increased freedom in the design. Moreover, electric machines react fast on commands providing an improved control over the alteration of the characteristic of the transmission unit.

It is particularly preferred that at least first electric machine is arranged downstream the transmission unit for subtracting torque from the downstream side of the transmission unit and converting this torque to electric energy. This provides energy that can be used for altering the characteristic of the transmission unit. Hence, it is not necessary to have an auxiliary power source and the requirements on a possible auxiliary power source can be relaxed. Typically, the energy should otherwise have been supplied to the driving wheels. However, the working conditions at which the characteristic of the transmission unit is advantageously altered are typically admitting that energy can be withdrawn from the driving wheels.

In addition it is preferred that at least a second electric machine is arranged upstream the transmission unit for receiving electric energy from the first electric machine and converting at least a part of this energy to torque that is added to the upstream side of the transmission unit. The use of a first and a second electric machine in this manner provides an excellent control over the alteration of the characteristic of the transmission unit.

It is also desirable to provide a working machine of the kind referred to in the introduction, which working machine enables a more effective operation of the working machine.

According to another aspect of the present invention, a working machine is provided with: a power source and a plurality of driving wheels; a working hydraulic system comprising at least one hydraulic pump powered by the power source for moving an implement on the working machine and/or for steering the working machine; a transmission line arranged between the power source (120) and the driving wheels for transmitting torque from the power source to the driving wheels; and a transmission unit arranged in the transmission line for reducing the mechanical interaction between the power source and the driving wheels.

In addition the working machine comprises:
at least one detecting unit for detecting at least one operational parameter indicative of a working condition of the working machine,
at least one control unit for determining if the characteristic of the transmission unit should be altered on the basis of a magnitude of the detected operational parameter,
at least one torque-modifying unit controlled by said control unit for altering the characteristic of the transmission unit if it is determined to be required.

The working machine displays the same or similar advantages as the method described above.

Further advantages and advantageous features of the invention are disclosed in the following description.

DEFINITIONS

The term "electric machine" should be understood as a term for an electric motor and/or generator. The electric machine can be driven by electricity to supply an output torque to a shaft or be mechanically driven by receiving torque on a shaft for producing electricity.

The term "transmission unit" comprises hydraulic clutches, both hydrodynamic clutches such as torque converters and hydrostatic clutches, as well as mechanical clutches. Thus, "transmission unit" comprises both torque converters which can increase the torque and ordinary skid clutches without ability to increase the torque.

The term "case load" refers to the working condition for a specific transmission unit at a given point in time. The "case load" at a given point in time can e.g. be described by means of the input torque $T_{jn}$ and the input rotational speed $n_{jn}$ applied to the transmission unit in conjunction with the output torque $T_{out}$ and the output rotational speed $n_{out}$ received from the transmission unit at that point in time.

The term "driving wheels" is meant to comprise vehicle wheels for direct engagement with the ground as well as vehicle wheels for driving a ground engaging member, such as tracks, crawlers or similar.

BRIEF DESCRIPTION OF THE DRAWINGS

A more detailed description of the present invention is given below with reference to a plurality of exemplifying embodiments as illustrated in the appended figures, in which.

DETAILED DESCRIPTION

Figure 1:
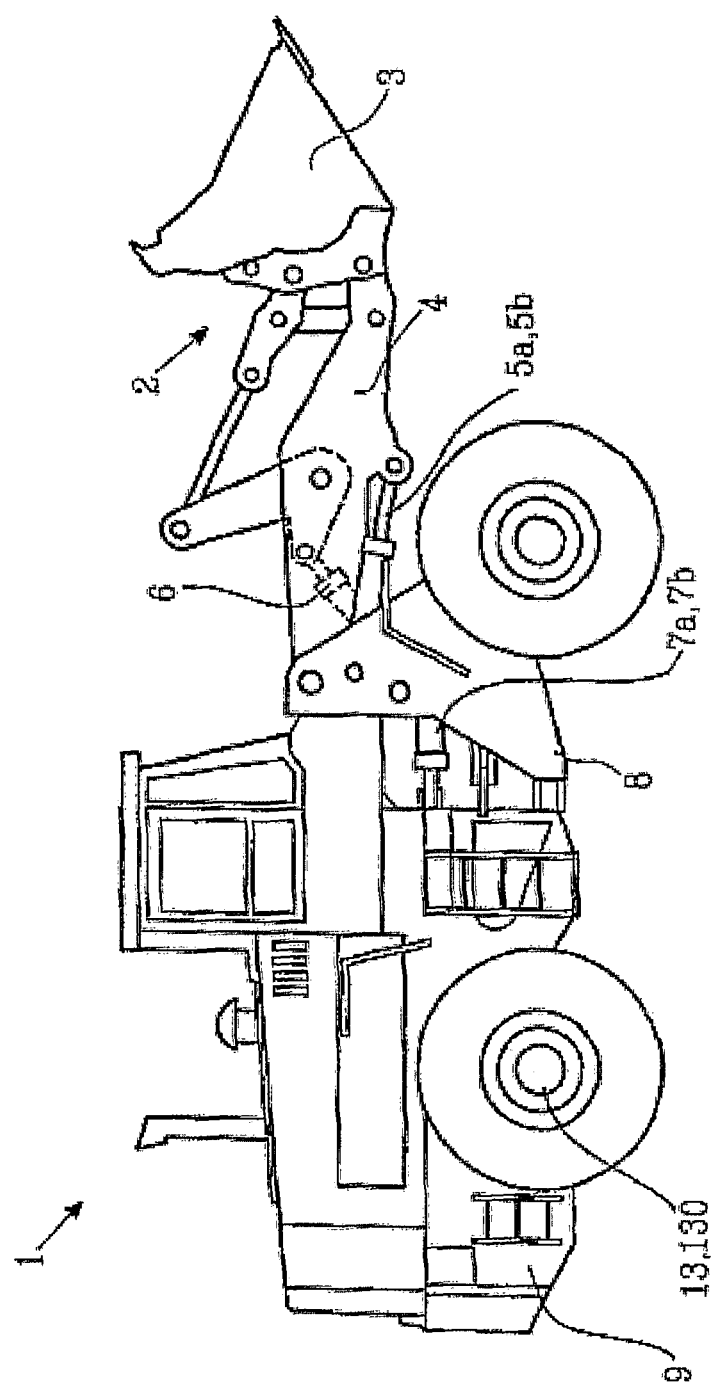
FIG. 1 is a lateral view illustrating a wheel loader having a bucket for loading operations, and a working hydraulic system for operating the bucket and steering the wheel loader.

FIG. 1 is an illustration of an exemplifying wheel loader 1 having an implement 2 in the form of a bucket 3. The bucket 3 is arranged on an arm unit 4 for lifting and lowering the bucket 3. The bucket 3 can also be tilted or pivoted relative to the arm unit 4. For this purpose the wheel loader 1 is provided with a working hydraulic system comprising at least one hydraulic pump (not shown in FIG. 1) and working cylinders 5a, 5b, 6 for lifting and lowering of the arm unit 4, and for tilting or pivoting the bucket 3. In addition, the working hydraulic system comprises working cylinders 7a, 7b for turning the wheel loader 1 by means of relative movement of a front body 8 and a rear body 9. These features of the wheel loader 1 and variations thereof are well known to those skilled in the art and they need no further explanation.

Figure 2:
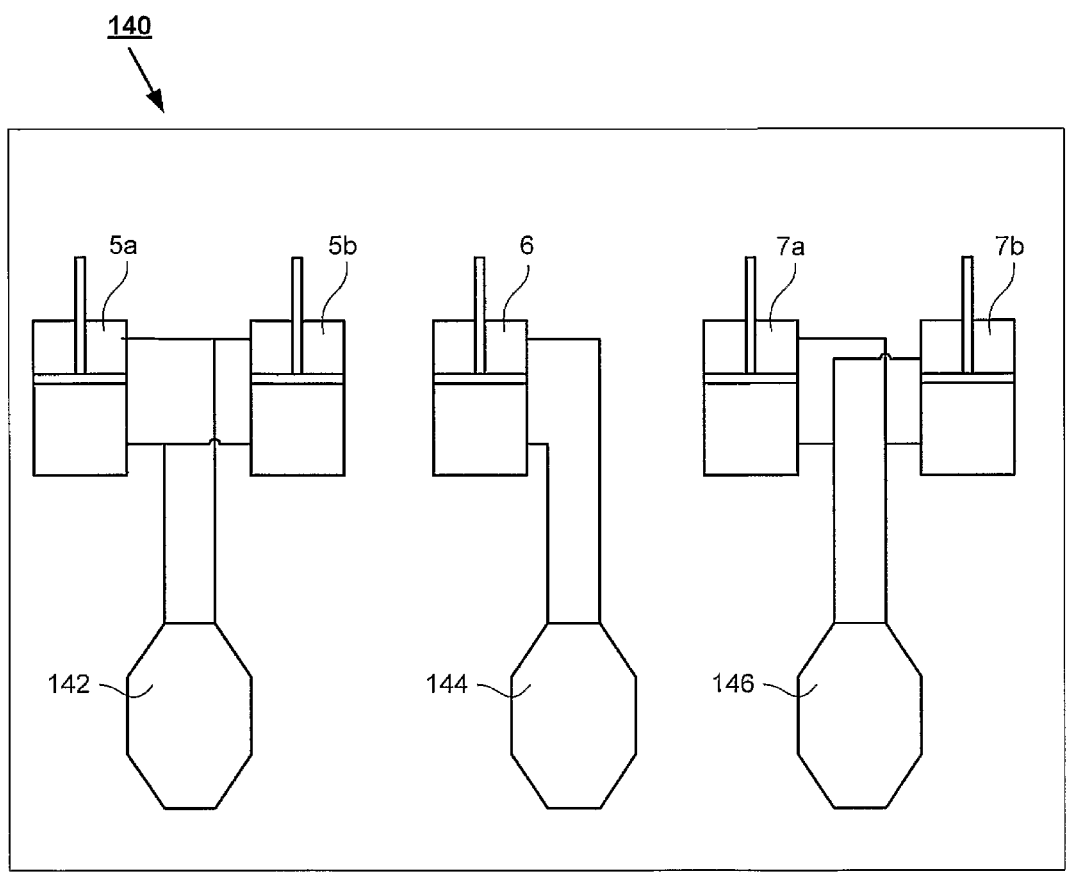
FIG. 2 is a schematic illustration of a working hydraulic system for a wheel loader.

FIG. 2 is a schematic illustration of an exemplifying working hydraulic system 140. The embodiment illustrated in FIG. 2 comprises two working cylinders known as lifting cylinders 5a, 5b. The lifting cylinders 5a, 5b are arranged for lifting and lowering the arm unit 4. A further working cylinder known as tilting cylinder 6 is arranged for tilting-in or tilting-out the bucket 3 relative to the arm unit 4. In addition, two working cylinders known as the steering cylinders 7a, 7b are arranged for steering the wheel loader 1. Three hydraulic pumps 142, 144, 146 supply the hydraulic cylinders with hydraulic oil. An operator of the wheel loader 1 can control the working cylinders by means of instruments connected to a control unit (not shown). Preferably the cylinders 5a, 5b, 6, 7a and 7b schematically illustrated in FIG. 2 correspond the cylinders 5a, 5b, 6, 7a and 7b shown in FIG. 1.

Figure 3:
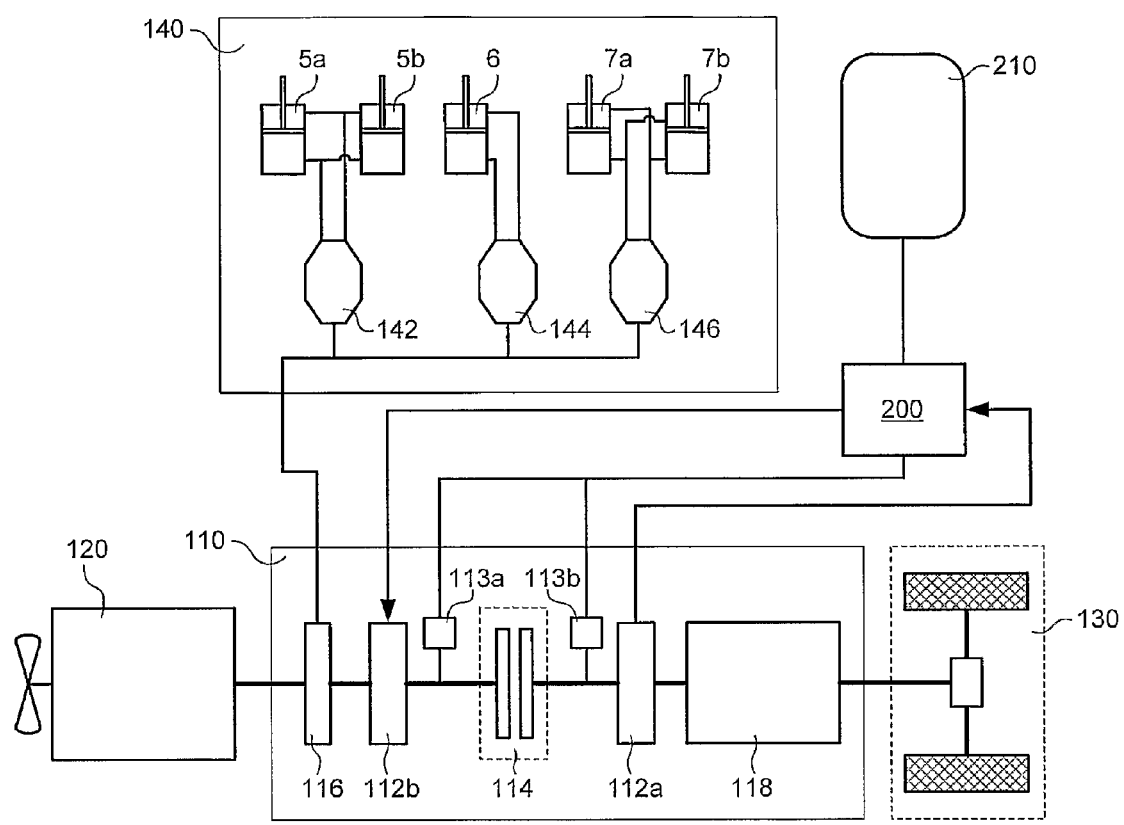
FIG. 3 is a schematic illustration of i.a. transmission line of a wheel loader according to an embodiment of the present invention.

FIG. 3 is a schematic illustration of i.a. a transmission line 110 of a wheel loader 1 according to an embodiment of the present invention. The internal combustion engine 120 of the wheel loader 1 is arranged at one end of the transmission line 110, whereas the driving wheels 130 of the wheel loader 1 are arranged at the other end of the transmission line 110. It follows that the internal combustion engine 120 is arranged to supply torque to the driving wheels 130 of the wheel loader 1 via the transmission line 110. It is preferred that the transmission line 110 comprises a gearbox 118 for varying the speed of the driving wheels 130 of the wheel loader 1 and for changing between forward and backward driving direction of the wheels 130. The gearbox 118 may e.g. be an automatic gearbox implying that there must not necessarily be a clutch (not shown) between the gearbox 118 and the driving wheels 130, which is common in the case of a manual gearbox.

As discussed above in the background to the present invention the transmission line 110 of a wheel loader is usually provided with a transmission unit 114 for reducing the mechanical interaction between the internal combustion engine 120 and the driving wheels 130, i.e. for providing slipping or skidding or even for temporally disengaging the internal combustion engine 120 from the driving wheels 130. The main purpose is to protect the combustion engine 120 from rapid changes in the working conditions of the gearbox 118 and the driving wheels 130.

The transmission unit 114 is preferably a hydraulic clutch of the type called hydrodynamic torque converter. As is well known, a torque converter is adapted to increase the input torque applied to the converter and the output torque can be in the interval of e.g. 1-3 times the input torque. The torque converter may also have a free wheel function and/or a lock-up function providing a direct operation without any increased torque. In case of a lock-up function it is preferred that the lock-up state provides a fixed transmission ratio of substantially 1:1. It should be added that alternative embodiments of the present invention may comprise a transmission unit 114 in the form of a skid clutch or similar without any torque-increasing ability. The skid clutch could be a hydraulic clutch as well as a mechanic clutch.

The exact position of the transmission unit 114 within the transmission line 110 is not decisive. However, it is preferred that the transmission unit 114 is positioned after or down streams the combustion engine 120 and before or up streams the gearbox 118.

In addition, the transmission line 110 of the wheel loader 1 is provided with a power transferring unit 116 for driving the hydraulic pumps 142, 144, 146 of the working hydraulic system 140 so as to enable the lifting and steering operations as mentioned before. The power transferring unit 116 may e.g. be gear wheels or some other suitable means arranged to interact with the transmission line 110 for transferring power from the combustion engine 120 to the hydraulic pumps 142, 144, 146. The power transferring unit 116 is preferably arranged to interact with the transmission line 110 in a position upstream the gear box 118 and more preferably in a position between the internal combustion engine 120 and the transmission unit 114.

It should be added that the combustion engine 120 can be replaced by other power sources, e.g. a power sources in the form of a gas turbine or even a fuel cell arrangement. In addition, the power transferring unit 116 may be fully or at least partly replaced by other power transferring means based on hydraulic or electric principles. For example, the hydraulic pumps 142, 144, 146 may be powered by means of electric motors receiving power from the combustion engine 120 via a generator arrangement or similar.

As can be seen in FIG. 3 the transmission line 110 is provided with at least two electric machines 112a, 112b or similar torque-modifying unit or units for adding and/or subtracting torque to and/or from the transmission line 110. The electric machines 112a, 112b are arranged to operatively adapt the characteristic of the transmission unit 114 and particularly to adapt the rigidness of the transmission unit 114 depending on the working condition of the wheel loader 1. Preferably, a first electric machine 112a is arranged in a suitable position downstream the transmission unit 114 (i.e. at the gear box side of the transmission unit 114), whereas a second electric machine 112b is arranged in a suitable position upstream the transmission unit 114 (Ae. at the combustion engine side of the transmission unit 114). More precisely, the first electric machine 112a is preferably arranged in a position between the transmission unit 114 and the gearbox 118, and the second electric machine 112b is preferably arranged in a position between the internal combustion engine 120 and the transmission unit 114. Naturally, other alternative positions are conceivable. The electric machines 112a, 112b and the torque converter 114 are coupled so that torque can be exchanged between the first electric machine 112a and the input shaft of the transmission unit 114, and between the second electric machine 112b and the output shaft of the transmission unit 114. The first electric machine 112a should preferably be able to operate in at least two quadrants, i.e. as generator in both clockwise and counter-clockwise direction of rotation. The second electric machine 112b should preferably be able to operate in at least one quadrant, i.e. as motor in at least one direction of rotation.

The electric machines 112a, 112b in FIG. 3 are electrically connected to each other via a transmission-control unit 200 or a similar control unit being arranged to control the machines 112a, 112b for adapting the characteristic of the transmission unit 114. This is preferably accomplished by controlling the motor and generator abilities of the electric machines 112a, 112b. The transmission-control unit 200 is preferably implemented as a hardware unit provided with the appropriate circuitry and software needed to accomplish the required functions, e.g. circuitry for processing and storing; and software for executing and controlling any required processing and storing. It should be emphasised that some embodiments of the present invention may have a very simple transmission-control unit 200 comprising a simple on/off switching function for connecting and disconnecting the electric machines 112a, 112b, e.g. on a command from the operator of the wheel loader exercising a push button or similar. However, other embodiments may have a more sophisticated transmission-control unit 200 provided with substantial processing capabilities and advanced switching functions for controlling the motor and generator abilities of the electric machines 112a, 112b depending on algorithms working on data received from sensors 113a, 113b arranged within the wheel loader 1 and preferably connected to the transmission-control unit 200. For this purpose the transmission-control unit 200 may e.g. use data in the form of sensed, measured or even calculated input torque Tin and input rotational speed nin applied to the torque converter 114, and output torque Tout and output rotational speed nout received from the torque converter 114. It should be emphasised that it is well known by those skilled in the art that input torque Tin and output torque Tout can be calculated by knowing the characteristic of the transmission-control unit 200 and the input rotational speed njn and the output rotational speed nout. Sensors for measuring torque and rotational speed are well known to those skilled in the art. Likewise, a wide range of commercially available control units with substantial processing capabilities and advanced switching functions for controlling electric machines are well known by those skilled in the art and they need no further description.

The transmission-control unit 200 is arranged to operatively connect the electric machines 112a, 112b to each other so that the first electric machine 112a operates as a generator and so that the second electric machine 112b operates as a motor. In particular, the transmission-control unit 200 is arranged to operatively connect the electric machines 112a, 112b so that the electric energy generated by the first electric machine 112a is used in the second electric machine 112b. This enables the first electric machine 112a downstream the transmission unit 114 to subtract torque from the downstream side of the transmission unit 114 and to convert this torque to electric energy, whereas it enables the second electric machine 112b upstream the transmission unit 114 to receive the electric energy produced by the first electric machine 112a and to convert this energy to torque that is added to the upstream side of the transmission unit 114. In this way the internal combustion engine 120 will experience a transmission unit with a softer characteristic compared to the actual and unaffected characteristic of the used transmission unit 114.

There are several strategies for adapting the characteristic of the transmission unit 114 as can be illustrated by the exemplifying embodiments describe below.

In an embodiment of the present invention it is preferred that substantially all electric energy produced by the first electric machine 112a is transferred by the transmission-control unit 200 to the second electric machine 112b. In other words, substantially all the torque subtracted by the first electric machine 112a from the downstream side of the transmission unit 114 is added by the second electric machine 112a to the upstream side of the transmission unit 114.

In another embodiment of the present invention it is preferred that a determined portion of the electric energy produced by the first electric machine 112a is transferred by the transmission-control unit 200 to the second electric machine 112b. In other words, a determined portion of the torque being subtracted the by first electric machine 112a from the downstream side of the transmission unit 114 is added to the upstream side of the transmission unit 114.

In still another embodiment of the present invention it is preferred that a variable amount of the electric energy produced by the first electric machine 112a is transferred by the transmission-control unit 200 to the second electric machine 112b. In other words, a variable amount of the torque being subtracted from the downstream side of the transmission unit 114 is added to the upstream side of the transmission unit 114.

The feedback of a variable amount of torque makes it possible to e.g. adopt a strategy wherein the torque subtracted from the downstream side of the transmission unit 114 is added to the upstream side of the transmission unit 114 in an amount that maintains the input torque from the combustion engine 120 to the transmission unit 114 at a substantially constant level. Naturally, this may only be accomplished to the extent and within the limits the subtracted torque is sufficient to maintain a substantially constant input torque. However, the support from an additional power source may extend the limits within which the input torque from the combustion engine 120 can be maintained substantially constant. This may e.g. be accomplished by means of an electric storage means 210 providing additional electric energy to the second electric machine 112b. An electric storage means 210 is illustrated in FIG. 3 and it will be more thoroughly discussed below.

In addition, the feedback of a variable amount of torque makes it possible to e.g. adopt a strategy wherein the output torque from the transmission unit 114 is maintained at a substantially constant level by subtracting a variable amount of torque from the downstream side of the transmission unit 114 and add this torque to the upstream side of the transmission unit 114. Naturally, this may be most feasible when the torque on the output side of the transmission unit 114 is provided with an increasing torque, e.g. due to an increased input torque to the transmission unit 114 from the combustion engine 120. The other way around, this may not be feasible when the torque on the output side of the transmission unit 114 is provided with a declining torque, e.g. due to a declining input torque to the transmission unit 114 from the combustion engine 120. However, an external power source, e.g. a battery, may certainly change this.

Moreover, the feedback of a variable amount of torque makes it possible to use a first transmission unit 114 having a first rigid characteristic for emulating a second transmission unit having a second softer characteristic.

To accomplish this it is necessary to know the characteristics of the soft transmission unit to be emulated. This characteristic can e.g. be represented by means of a suitable lookup table that is built on empirical measurements in laboratory conditions and/or by sampling data during real life use.

An exemplifying table representing the characteristics of a transmission unit to be emulated may e.g. comprise the following variables:

Tin=input torque to the transmission unit
nin=input rotational speed to the transmission unit
Tout=output torque from the transmission unit
nout=output rotational speed from the transmission unit This illustrates that a certain torque Tjn and a certain rotational speed njn being inputted to the transmission unit correspond to a certain torque Tout and a certain rotational speed njn being outputted from the soft transmission unit. Such a table can comprise all relevant cases of load for a certain transmission unit, e.g. measured in laboratory conditions and/or sampled in real life use.

Alternatively or additionally, the characteristic of a transmission unit may be described by means of one or several mathematical expressions or similar. For example, the simplified converter model given by the two exemplifying mathematical relations 1 and 2 below is commonly used to describe the characteristic of a transmission unit in the form of a hydrodynamic torque converter. Naturally, depending on the nature of the transmission unit there are clearly other mathematical expressions or similar that can be used to describe the characteristic of a particular transmission unit.

The simplified converter model mentioned above is based on two simple empirical relations.

$$T_{in} = k(v)n_{in}^2, \text{ where } k(v) = \frac{T_{in \cdot ref} v}{n_{in \cdot ref}^2} \quad (1)$$

$$T_{out} = \mu(v)T_{in} \quad (2)$$

wherein

Tin represents the present input torque
Tin.ref represents the input torque at a determined reference input rotational speed
Tout represents the present output torque
nin represents the present input rotational speed
nin.ref represents a determined reference input rotational speed
k(v) represents the absorption factor for the converter in question at different input and output rotational speeds
μ(v) represents the amplifying factor for the converter in question at different input and output rotational speeds
v represents the input rotational speed njn divided by the output rotational speed nout.

Values for the factors k(v) and μ(v) for a certain torque converter can be obtained by running the converter at a reference input rotational speed njn,ref (e.g. at 1000 rpm) while the output rotational speed is varied. The simplified converter model described by the relations 1, 2 above and the manner of obtaining the factors k(v) and μ(v) are well known facts to those skilled in the art and they need no further explanation.

Considering the present invention and the above discussion of the characteristic of a transmission unit it should be clear that a first rigid transmission unit can be used to emulate a second soft transmission unit by subtracting a first amount of torque from the downstream side of the rigid transmission unit and by adding a second amount of torque to the upstream side of the rigid transmission unit. The amount of torque subtracted from the downstream side of the rigid transmission unit and the amount of torque added to the upstream side of the rigid transmission unit should then be determined so that the current case load is adapted to a case load that is determined by the characteristic of a softer transmission unit.

As an example we can use the two relations Tin=k(v)nin$^2$ and Tout=μ(v)Tin described above and the known factors krigid(v) and μrigid(v) for a rigid torque converter to calculate the input and output torques Tjn rigid and Tout rigid for the rigid torque converter at a specific input and output rotational speed nin, nout. Likewise, given the known factors ksoft(v) and μsoft(v) for a softer torque converter we can also calculate the corresponding input and output torques Tin_soft and Tout_soft for the soft converter at the same input and output rotational speeds njn, nout. Hence, by maintaining the same input and output rotational speed njn, nout and by subtracting a first amount of torque from the downstream side and adding a second amount of torque to the upstream side of the rigid torque converter so that the new input and output torques equals the input and output torques Tin_soft and Tout_soft it is possible to adapt the current case load for the rigid torque converter to a corresponding case load for the soft torque converter. A combustion engine connected to the input shaft of the rigid torque converter will then experience the characteristic of the soft converter instead of the characteristic of the unaffected rigid converter.

The same can be accomplished by using a look-up table, e.g. the exemplifying look-up table described above or similar defining the characteristic of a softer torque converter. Knowing the current input and output rotational speeds njn, nout for a rigid torque converter it is be possible to find the same or at least similar pair of input and output rotational speeds in the look-up table for the soft converter together with the input and output torques Tin_soft and Tout soft for that converter at that input and out put speed. By maintaining the same input and output rotational speed nin, nout and by subtracting a first amount of torque from the downstream side and adding a second amount of torque to the upstream side of the rigid torque converter so that the new input and output torques equals the input and output torques Tin_soft and Tout_soft it is possible to adapt the current case load for the rigid torque converter to a corresponding case load for the soft torque converter.

Naturally, it is preferred that the characteristic of the transmission unit 114 is adapted only for those phases in the working condition of a wheel loader that requires a softer transmission unit. As previously described, the bucket filling phase and the bucket emptying phase in a short-cycle load are examples of such phases.

Both the bucket filling phase and the bucket emptying phase in a short-cycle load are performed while the wheel loader is running on the lowest gear or at least on a low gear. Hence, in an embodiment of the present invention it is preferred to adapt the characteristic of the transmission unit 114 when the wheel loader is running on the lowest gear or at least on a low gear.

Similarly, at least the bucket emptying phase in a short-cycle load is typically performed while the operator exercises the brakes to accomplish a slow forward movement for the wheel loader. Hence, in an embodiment of the present invention it is preferred to adapt the characteristic of the transmission unit 114 when the operator exercises the brakes.

In addition, a push button or some other control can be used for manually activating and/or selecting the desired strategy for adapting the characteristic of the transmission unit 114.

It should be added that an embodiment of the present invention comprises an additional power source in the form of an electric energy storage means 210 for receiving electric energy from the first electric machine 112a and providing electric energy to the second electric machine 112b. The electric storage means 210 makes it possible to at least temporary provide the second electric machine 112b with an amount of electric power that exceeds the amount currently produced by the first electric machine 112a when subtracting torque from the downstream side of the transmission unit 114. In addition, the electric storage means 210 may be provided with charging electric energy from the first electric machine 112a, e.g. when the amount of electric power currently produced by the first electric machine 112a exceeds the amount currently required for the second electric machine 112b. This provides an improved flexibility in reducing the rigidness of the transmission unit (114) by means of the first and second electric machines 112a, 112b as described above. The electric storage means 210 may e.g. be a battery or a super capacitor or some other suitable electric storage means.

Although the exemplifying working hydraulic system 140 illustrated in FIG. 2-3 has three hydraulic pumps 142, 144, 146 other embodiments may have one, two, four or more hydraulic pumps. In a preferred embodiment of the invention the working machine has at least two implement and/or steering functions, and at least one said hydraulic pump is arranged for each implement and/or steering function.

As described in connection to the FIG. 1, the working machine 1 can have an implement 2 in the form of a bucket 3 which is operated by means of the working hydraulic system 140. However, it should be emphasised that other implements are usable. When applying the invention on a working machine such as an articulated hauler or a truck, the implement can instead be for example a dump body. Usually a hydraulic pump and working cylinders are used for the operation of the dump body during the dumping movement.

It is to be understood that the present invention is not limited to the embodiments described above and illustrated in the drawings; rather, the skilled person will recognize that many changes and modifications may be made within the scope of the appended claims.

The invention claimed is:

1. A method for operating a working machine provided with: a power source and a plurality of driving wheels; a working hydraulic system comprising at least one hydraulic pump powered by the power source for moving an implement on the working machine and/or for steering the working machine; a transmission line arranged between the power source and the driving wheels for transmitting torque from the power source to the driving wheels; and a transmission unit arranged in the transmission line for reducing mechanical interaction between the power source and the driving wheels, comprising the steps of:
   detecting at least one operational parameter indicative of a working condition of the working machine,
   determining if a characteristic of the transmission unit should be altered on the basis of a magnitude of the detected operational parameter,
   altering the characteristic of the transmission unit if it is determined to be required,
   wherein the working condition determines a predetermined working operation with the implement.

2. A method according to claim 1, comprising the steps of: temporarily altering the characteristic of the transmission unit during the predetermined working operation.

3. A method according to claim 1, comprising the steps of: altering the characteristic of the transmission unit by altering its tendency to slip.

4. A method according to claim 1, comprising the steps of: adding and/or subtracting torque upstream and/or downstream of the transmission unit by using at least one torque-modifying unit in case the characteristic of the transmission unit should be altered.

5. A method according to claim 4, comprising the steps of: using at least one electric machine for adding and/or subtracting the torque.

6. A method according to claim 5, comprising the steps of: using at least a first electric machine arranged downstream the transmission unit for subtracting torque from the downstream side of the transmission unit and converting this torque to electric energy.

7. A method according to claim 6, comprising the steps of: using at least a second electric machine arranged upstream the transmission unit for receiving electric energy from the first electric machine and converting at least a part of this energy to torque that is added to the upstream side of the transmission unit.

8. The method according to claim 7, comprising using the electric machines so as to transfer substantially all electric energy produced by the first electric machine to the second electric machine.

9. The method according to claim 7, comprising using the electric machines so as to transfer a determined portion of the electric energy produced by the first electric machine to the second electric machine.

10. The method according to claim 7, wherein the electric machines transfer a variable amount of the electric energy produced by the first electric machine to the second electric machine.

11. The method according to claim 10, wherein the amount of electric energy produced by the first electric machine and the amount of electric energy transferred to the second electric machine are determined so that the input torque from the power source to the transmission unit is maintained at a substantially constant level.

12. The method according to claim 10, wherein the amount of electric energy produced by the first electric machine and the amount of electric energy transferred to the second electric machine are determined so that the output torque from the transmission unit is maintained at a substantially constant level.

13. The method according to claim 10, wherein the amount of electric energy produced by the first electric machine and the amount of electric energy transferred to the second electric machine are determined so that the current case load determined by the characteristic of the current transmission unit is adapted to another case load determined by the characteristic of a softer transmission unit.

14. A method according to claim 5, comprising the steps of: using a control unit for controlling at least one electric machine.

15. The method according to claim 1, wherein a second machine is at least partly provided with electric energy from an electric energy storage means.

16. The method according to claim 15, wherein a first electric machine provides charging electric energy to the storage means.

17. A method according to claim 1, comprising the steps of: adding torque to the transmission line.

18. A method according to claim 1, comprising that: the power source is mechanically connected to the working hydraulic system.

19. A method according to claim 1, comprising that: the power source is an internal combustion engine.

20. The method according to claim 1, comprising that the operated working machine is a wheel loader.

21. A working machine provided with: a power source and a plurality of driving wheels; a working hydraulic system comprising at least one hydraulic pump powered by the power source for moving an implement on the working machine and/or for steering the working machine; a transmission line arranged between the power source and the driving wheels for transmitting torque from the power source to the driving wheels; and a transmission unit arranged in the transmission line for reducing the mechanical interaction between the power source and the driving wheels, comprising:
- at least one detecting unit for detecting at least one operational parameter indicative of a working condition of the working machine,
- at least one control unit for determining if the characteristic of the transmission unit should be altered on the basis of a magnitude of the detected operational parameter,
- at least one torque-modifying unit controlled by the control unit for altering the characteristic of the transmission unit if it is determined to be required,
- wherein the control unit is arranged to operatively determine the working condition with reference to a predetermined working operation with the implement.

22. A working machine according to claim 21, wherein: the control unit is arranged to temporarily alter the characteristic of the transmission unit during the predetermined working condition.

23. A working machine according to claim 21, wherein: the control unit is arranged to operatively alter the characteristic of the transmission unit by altering its tendency to slip.

24. A working machine according to claim 21, wherein: the at least one torque-modifying unit is arranged to operatively add and/or subtract torque upstream and/or downstream of the transmission unit in case the characteristic of the transmission unit should be altered.

25. A working machine according to claim 24, wherein: the torque-modifying unit comprises at least one electric machine being arranged to operatively add and/or subtract the torque.

26. A working machine according to claim 25, wherein: at least a first electric machine is arranged downstream the transmission unit for operatively subtract torque from the downstream side of the transmission unit and convert this torque to electric energy.

27. A working machine according to claim 26, wherein: at least a second electric machine is arranged upstream the transmission unit for operatively receive electric energy from the first electric machine and convert this energy to torque that is added to the upstream side of the transmission unit.

28. A working machine according to claim 25, wherein: at least one electric machine is arranged to be operatively controlled by the control unit.

29. A working machine according to claim 21, wherein: the transmission line is arranged to receive and/or provide torque for operatively altering the characteristic of the transmission unit if it is determined to be required.

30. A working machine according to claim 21, wherein a first electric machine is arranged between the transmission unit and a gearbox, or between the transmission unit and the driving wheels.

31. A working machine according to claim 30, wherein a second electric machine is arranged between an engine and the transmission unit.

32. A working machine according to claim 21, wherein the transmission unit is a hydrodynamic torque converter; or a hydraulic or mechanic skid clutch.

33. A working machine according to claim 21, wherein: the power source is mechanically connected to the working hydraulic system.

34. A working machine according to claim 21, wherein: the power source is an internal combustion engine.

35. A working machine according to claim 21, wherein the working machine is a wheel loader.

36. A working machine according to claim 21, wherein the working machine has at least two implement and/or steering functions, and in that at least one hydraulic pump is arranged for each implement and/or steering function.

37. A working machine according to claim 21, wherein the working machine comprises three hydraulic pumps; a first hydraulic pump being arranged to provide a lifting and lowering function of the implement, a second hydraulic pump being arranged to provide a tilting function of the implement, and a third hydraulic pump being arranged to provide the steering function of the working machine.

* * * * *